United States Patent
Ketels et al.

(10) Patent No.: US 10,493,878 B2
(45) Date of Patent: Dec. 3, 2019

(54) MOTION SICKNESS MITIGATION (71) Applicant: FAURECIA AUTOMOTIVE SEATING, LLC, Auburn Hills, MI (US)

(72) Inventors: Cedric Ketels, Holland, MI (US); Rod Goodrich, Watervliet, MI (US); Matthew K. Benson, Holland, MI (US); Alfred H. Bransdorfer, Holland, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 56 days.

(21) Appl. No.: 15/852,010

(22) Filed: Dec. 22, 2017

(65) Prior Publication Data
US 2019/0193610 A1  Jun. 27, 2019

(51) Int. Cl.
| *B60N 2/02* | (2006.01) |
| *B60N 2/50* | (2006.01) |
| *F16F 15/04* | (2006.01) |
| *B60N 2/54* | (2006.01) |

(52) U.S. Cl.
CPC .............. *B60N 2/501* (2013.01); *B60N 2/504* (2013.01); *B60N 2/542* (2013.01); *F16F 15/04* (2013.01); *B60N 2002/0268* (2013.01)

(58) Field of Classification Search
CPC .......... B60N 2/66; B60N 2/72; B60N 2/7094; B60N 2/0232; B60N 2/68
See application file for complete search history.

(56) References Cited

U.S. PATENT DOCUMENTS

| 3,144,695 A | 8/1964 | Budwig |
| 3,341,903 A | 9/1967 | Buntic |
| 3,632,076 A | 1/1972 | Rogers, Jr. |
| 4,324,414 A | 4/1982 | Wilkes |
| 4,432,525 A | 2/1984 | Duvall |
| 4,500,062 A | 2/1985 | Sandvik |
| 4,515,337 A | 5/1985 | Torras |
| 4,685,730 A | 8/1987 | Linguanotto |
| 4,869,554 A | 9/1989 | Abu-Isa |
| 4,883,320 A | 11/1989 | Izumida |
| 5,013,086 A | 5/1991 | Benzur |
| 5,368,118 A | 11/1994 | Hoefle |
| 5,393,126 A | 2/1995 | Boulva |

(Continued)

FOREIGN PATENT DOCUMENTS

| CA | 2125642 | 12/1994 |
| CN | 1618654 | 5/2005 |

(Continued)

OTHER PUBLICATIONS

German Office Action for German App. No. 10 2016 123 681.0 dated Oct. 19, 2017, 601-666 DE, 5 pages, (no English translation available).

(Continued)

*Primary Examiner* — Shin H Kim
(74) *Attorney, Agent, or Firm* — Barnes & Thornburg LLP (57) ABSTRACT

An occupant support adapted for use in a vehicle includes a seat frame and a seat pad. The seat frame is adapted to couple with the vehicle for movement with the vehicle. The seat pad is adapted to provide a comfortable support interface for an occupant of the occupant support.

18 Claims, 5 Drawing Sheets

(56) References Cited

U.S. PATENT DOCUMENTS

| | | | |
|---|---|---|---|
| 5,558,399 A | 9/1996 | Serber | |
| 5,582,381 A | 12/1996 | Graf | |
| 5,769,490 A * | 6/1998 | Falzon | B60N 2/66 297/284.3 |
| 5,976,097 A | 11/1999 | Jensen | |
| 5,992,933 A | 11/1999 | West | |
| 6,068,280 A | 5/2000 | Torres | |
| 6,793,289 B2 | 9/2004 | Kuster | |
| 6,814,407 B2 * | 11/2004 | Mundell | A47C 7/465 297/284.2 |
| 7,044,553 B2 | 5/2006 | Ropp | |
| 7,063,386 B2 | 6/2006 | Dowty | |
| 7,083,233 B2 * | 8/2006 | Massara | B60N 2/66 297/284.4 |
| 7,281,749 B2 | 10/2007 | Yamada | |
| 7,334,758 B2 | 2/2008 | Williamson | |
| 7,338,126 B2 | 3/2008 | Ropp | |
| 7,481,493 B2 | 1/2009 | Fujita | |
| 7,490,572 B2 | 2/2009 | Grober | |
| 7,506,910 B2 | 3/2009 | Leitner | |
| 7,517,024 B2 | 4/2009 | Cvek | |
| 7,575,206 B2 | 8/2009 | Meier | |
| 7,722,526 B2 | 5/2010 | Kim | |
| 7,731,294 B2 | 6/2010 | Yasuda | |
| 7,841,662 B2 * | 11/2010 | Samain | B60N 2/0232 297/284.4 |
| 7,971,939 B2 | 7/2011 | Fujita | |
| 8,020,933 B2 * | 9/2011 | Kim | B60N 2/66 297/284.8 |
| 8,100,471 B2 | 1/2012 | Lawall | |
| 8,340,869 B2 | 12/2012 | Wakita | |
| 8,662,585 B2 | 3/2014 | Garvis | |
| 8,684,460 B2 * | 4/2014 | Weir | B60N 2/66 297/284.4 |
| 8,690,750 B2 | 4/2014 | Krueger | |
| 8,840,186 B2 * | 9/2014 | Samain | B60N 2/0232 297/284.1 |
| 8,911,015 B2 | 12/2014 | Cohen | |
| 9,045,058 B2 | 6/2015 | Katoh | |
| 9,193,280 B2 * | 11/2015 | McMillen | B60N 2/66 |
| 9,193,287 B2 * | 11/2015 | McMillen | B60N 2/0232 |
| 9,242,581 B2 | 1/2016 | Farooq | |
| 9,272,643 B2 | 3/2016 | Nagayasu | |
| 9,428,083 B2 | 8/2016 | Lehner | |
| 9,494,940 B1 | 11/2016 | Kentley | |
| 9,517,777 B2 | 12/2016 | Hall | |
| 9,550,440 B2 | 1/2017 | Nagayasu | |
| 9,561,741 B2 | 2/2017 | Nagayasu | |
| 9,604,560 B1 * | 3/2017 | Ellis | B60N 2/6673 |
| 9,682,682 B2 | 6/2017 | Aoki | |
| 9,713,380 B2 | 7/2017 | Gehner | |
| 9,751,434 B2 * | 9/2017 | Sugiyama | B60N 2/02 |
| 9,802,513 B2 | 10/2017 | Katoh | |
| 9,950,646 B2 | 4/2018 | Katoh | |
| 9,975,458 B2 | 5/2018 | Takeuchi | |
| 2002/0135214 A1 | 9/2002 | Ursel | |
| 2003/0116999 A1 | 6/2003 | Fujita | |
| 2004/0245824 A1 * | 12/2004 | McMillen | B60N 2/0228 297/284.4 |
| 2005/0179294 A1 | 8/2005 | Dowty | |
| 2006/0055214 A1 | 3/2006 | Serber | |
| 2006/0138831 A1 * | 6/2006 | McMillen | B60N 2/66 297/284.1 |
| 2008/0023995 A1 | 1/2008 | Ott | |
| 2009/0115234 A1 * | 5/2009 | Samain | B60N 2/0232 297/284.2 |
| 2010/0268133 A1 * | 10/2010 | Samain | B60N 2/0232 601/100 |
| 2013/0175838 A1 * | 7/2013 | Oshima | B60N 2/4228 297/284.3 |
| 2015/0105641 A1 | 4/2015 | Austin | |
| 2015/0266448 A1 | 9/2015 | Aoki | |
| 2015/0343924 A1 | 12/2015 | Takeuchi | |
| 2016/0096450 A1 | 4/2016 | Kondrad | |
| 2016/0159254 A1 | 6/2016 | Katoh | |
| 2016/0243967 A1 * | 8/2016 | Seibold | B60N 2/68 |
| 2017/0129373 A1 | 5/2017 | Knox | |
| 2018/0222518 A1 | 8/2018 | Hill | |

FOREIGN PATENT DOCUMENTS

| | | |
|---|---|---|
| CN | 101274604 | 10/2008 |
| CN | 104758153 | 7/2015 |
| DE | 10041910 | 1/2002 |
| DE | 102004058503 | 1/2006 |
| DE | 102009048902 | 4/2011 |
| DE | 102011109470 | 2/2012 |
| DE | 102011009211 A1 | 7/2012 |
| DE | 102015117980 | 5/2016 |
| EP | 0185388 A1 | 6/1986 |
| EP | 1193117 | 4/2002 |
| EP | 1663727 | 6/2006 |
| FR | 2061931 | 6/1971 |
| FR | 2776583 | 10/1999 |
| GB | 1330683 A | 9/1973 |
| GB | 8816607 | 8/1988 |
| GB | 2206787 | 1/1989 |
| GB | 2206787 B | 1/1989 |
| GB | 2407028 | 4/2005 |
| GB | 201307595 | 6/2013 |
| JP | 2003299231 A | 10/2003 |
| WO | 2004026080 | 4/2004 |
| WO | 2005025945 | 3/2005 |
| WO | 2005037020 | 4/2005 |
| WO | 2005094632 | 10/2005 |
| WO | 2006083158 | 8/2006 |
| WO | 2006095455 A1 | 9/2006 |
| WO | 2016197068 | 12/2016 |

OTHER PUBLICATIONS

Office Action dated Feb. 15, 2019 for U.S. Appl. No. 15/856,341 (pp. 1-10).

Extended European Search Report for European App. No. 17206306.7 dated May 14, 2018, 4175 EP II, 5 pages.

* cited by examiner

MOTION SICKNESS MITIGATION

BACKGROUND

The present disclosure relates to occupant supports, and particularly to occupant support including a seat. More particularly, the present disclosure relates to occupant supports used in a vehicle.

SUMMARY

According to the present disclosure, an occupant support adapted for use in a vehicle includes a seat frame and a seat pad. The seat frame is adapted to couple with the vehicle for movement with the vehicle. The seat pad is adapted to provide a comfortable support interface for an occupant resting on the occupant support.

In illustrative embodiments, the occupant support further includes a suspension system that facilitates relative movement between the seat pad and the seat frame. In illustrative embodiments, the suspension system includes a suspension mat and a plurality of suspension-control units coupled to the seat frame and configured to support the suspension mat relative to the seat frame.

In the illustrative embodiments, each suspension-control unit includes a band coupled to the suspension mat and an actuator coupled to the band and to the seat frame. The actuators are configured to lengthen or shorten the bands to move the suspension mat relative to the seat frame.

In illustrative embodiments, the actuator change a taughtness of the bands. As a result, the respective spring constants varying how much each band changes in length when an occupant rests on the suspension mat.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
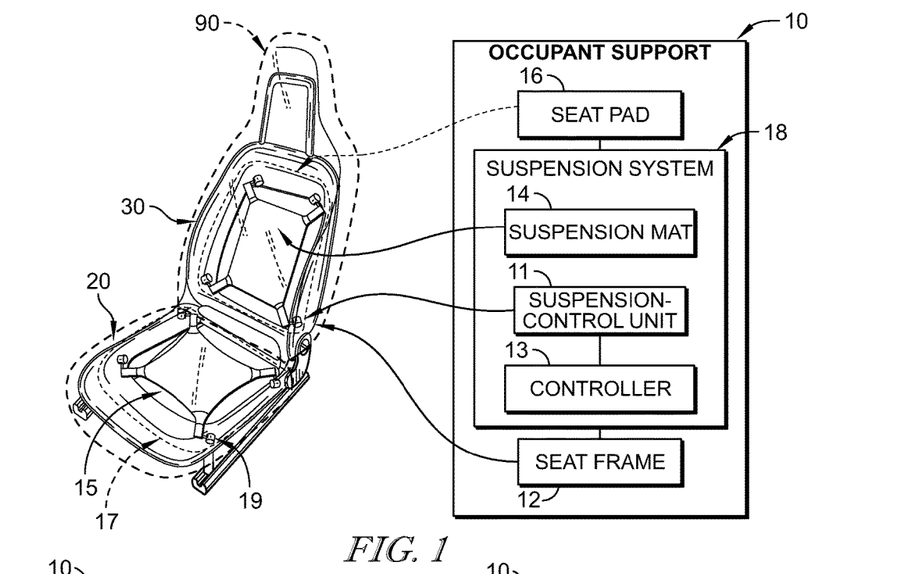
FIG. 1 is a perspective and diagrammatic view of an occupant support adapted for use in a passenger vehicle showing that the occupant support includes a seat frame, a seat pad, and a suspension system and suggesting that the suspension system supports the seat pad for movement relative to the seat frame in response to an acceleration of the seat frame to minimize motion sickness of an occupant of the occupant support.

An occupant support 10 in accordance with the present disclosure is shown in FIG. 1. Occupant support 10 includes a seat frame 12, a seat pad 16, and a suspension system 18 coupled to seat frame 12 and configured to support seat pad 16 relative to seat frame 12. Suspension system 18 includes a suspension mat 14 and a plurality of suspension-control units 11 configured to support suspension mat 14 for movement relative to seat frame 12 as suggested in FIGS. 2 and 3. A controller 13 is configured to coordinate activation of suspension-control units 11 to change a tension in suspension mat 14 in response to acceleration of a vehicle where occupant support 10 is mounted to alter a sitting position of an occupant of occupant support 10 to reduce the effects from the acceleration observed by the occupant and minimize motion sickness as suggested in FIG. 1.

Figure 2:
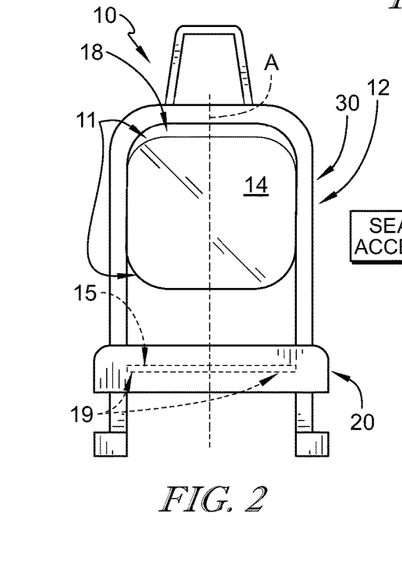
FIG. 2 is a front elevation and diagrammatic view of the occupant support of FIG. 1 showing that suspension mats included in the suspension system are aligned with the seat frame to support the occupant in an upright position on the occupant support.

Seat frame 12 includes a seat pan 20 and a seat back 30 coupled to seat pan 20 as shown in FIG. 2. Suspension mat 14 is coupled to seat back 30 by suspension-control units 11 and a suspension mat 15 is coupled to seat pan 20 by suspension-control units 19. Suspension mat 15 is configured to support a seat pad 17 for movement relative to seat frame 12 as suggested in FIG. 1. In some embodiments, suspension mats 14, 15 are elastic.

Figure 3:
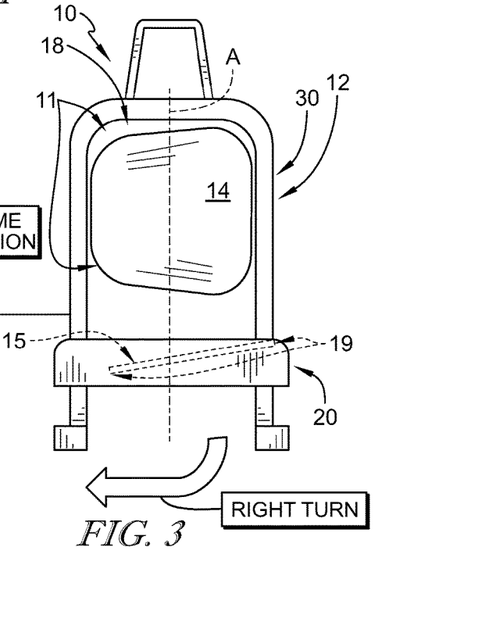
FIG. 3 is a view similar to FIG. 2 suggesting that tension in the suspension mats has changed in response to acceleration experienced by the seat during a right turn of a vehicle supporting the seat frame and suggesting that the suspension mats support the occupant in a leaning position on the occupant support to reduce the effects from the acceleration observed by the occupant to minimize motion sickness.

Suspension-control units 11, 19 are configured to vary a tension of suspension mats 14, 15 and cause suspension mats 14, 15 to move relative to seat frame 12 in response to acceleration of seat frame 12 as suggested in FIGS. 2 and 3. For example, an occupant of occupant support 10 sits in an upright position generally aligned with an axis A of occupant support 10 during steady-state movement of a vehicle where occupant support 10 is mounted. Suspension-control units 11, 19 move suspension mats 14, 15, respectively, toward a left side of seat frame 12 during a right turn of the vehicle to lean the occupant relative to axis A toward a right side of seat frame 12 so that the effects from the acceleration observed by the occupant are reduced to minimize a potential for the occupant to become motion sick.

Figure 4:
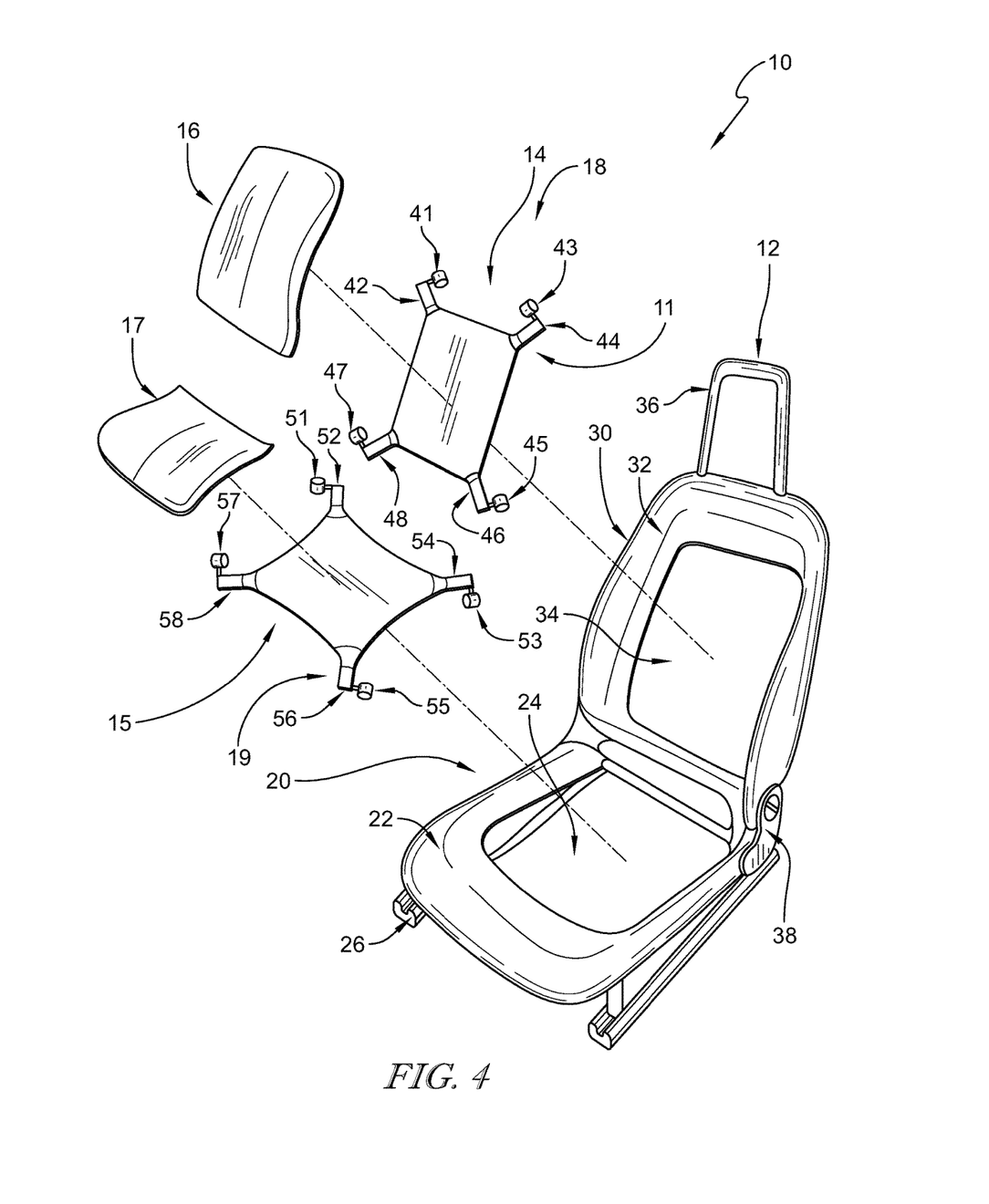
FIG. 4 is an exploded assembly view of the occupant support of FIG. 1 showing that the frame includes a seat-pan space and a seat-back space and suggesting that the suspension mats are received in the seat-pan space and seat-back space and connected to the seat frame by suspension-control units for moving the suspension mats relative to the seat frame.

Seat pan 20 includes a seat-pan rim 22 and a seat-pan space 24 defined by seat-pan rim 22 as shown in FIG. 4. A seat base 26 is coupled to seat pan 20 and configured to couple occupant support 10 with a vehicle for movement therewith. Seat back 30 includes a seat-back rim 32 and a seat-back space 34 defined by seat-back rim 32. In some embodiments, an integral or movable head rest portion 36 is coupled to seat back 30. A bracket 38 couples seat back 30 with seat pan 20 and allows seat back 30 to pivot relative to seat pan 20.

Suspension mat 14 is received in seat-back space 34 and coupled to seat-back rim 32 by suspension-control units 11 as suggested in FIG. 4. Each suspension-control unit 11 includes a band 42, 44, 46, 48 coupled to suspension mat 14 and actuators 41, 43, 45, 47 (such as a motor) coupled to bands 42, 44, 46, 48, respectively. Suspension mat 14 includes a body and a perimeter edge defined around the body and suspension-control units 11 are coupled along the perimeter edge to move the perimeter edge relative to seat frame 12.

In the illustrative embodiment, suspension mat 14 is rectangular and bands 42, 44, 46, 48 are coupled to corners of suspension mat 14. Actuators 41, 43, 45, 47 are configured to move bands 42, 44, 46, 48 to vary a tension of suspension mat 14. In some embodiments, a post is connected between respective bands 42, 44, 46, 48 and actuators 41, 43, 45, 47. In some embodiments, bands 42, 44, 46, 48 are shortened by rolling each band 42, 44, 46, 48 onto itself or winding each band 42, 44, 46, 48 around itself. Seat pad 16 mounts on suspension mat 14 for movement with suspension mat 14.

Suspension mat 15 is received in seat-pan space 24 and coupled to seat-pan rim 22 by suspension-control units 19 as suggested in FIG. 4. Each suspension-control unit 19 includes a band 52, 54, 56, 58 coupled to suspension mat 15 and actuators 51, 53, 55, 57 coupled to bands 52, 54, 56, 58, respectively. Suspension mat 15 includes a body and a perimeter edge defined around the body and suspension-control units 19 are coupled along the perimeter edge to move the perimeter edge relative to seat frame 12. In the illustrative embodiment, suspension mat 15 is rectangular and bands 52, 54, 56, 58 are coupled to corners of suspension mat 15. Actuators 51, 53, 55, 57 are configured to lengthen or shorten bands 52, 54, 56, 58 to move suspension mat 15 relative to seat frame 12.

In some embodiments, a post is connected between respective bands 42, 44, 46, 48 and actuators 41, 43, 45, 47. In some embodiments, bands 42, 44, 46, 48 are shortened by rolling each band 42, 44, 46, 48 onto itself or winding each band 42, 44, 46, 48 around itself. Seat pad 17 mounts on suspension mat 15 for movement with suspension mat 15.

Figure 5:
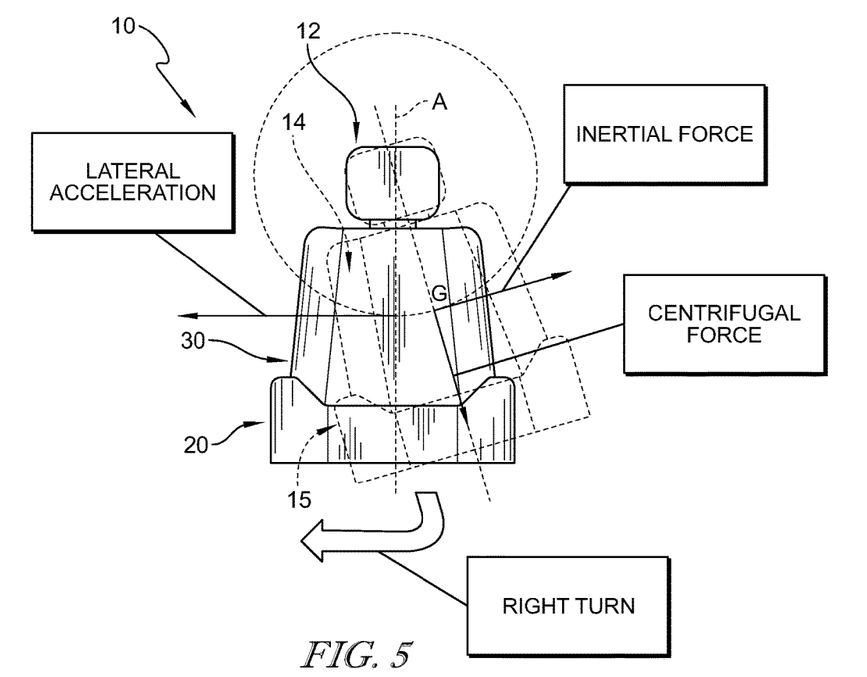
FIG. 5 is a front elevation and diagrammatic view of the occupant support of FIG. 1 illustrating forces experienced by the occupant during lateral acceleration of the seat frame from a right turn of a vehicle supporting the occupant support and suggesting that movement of the suspension system reduces the effects from the acceleration observed by the occupant.
Figure 6:
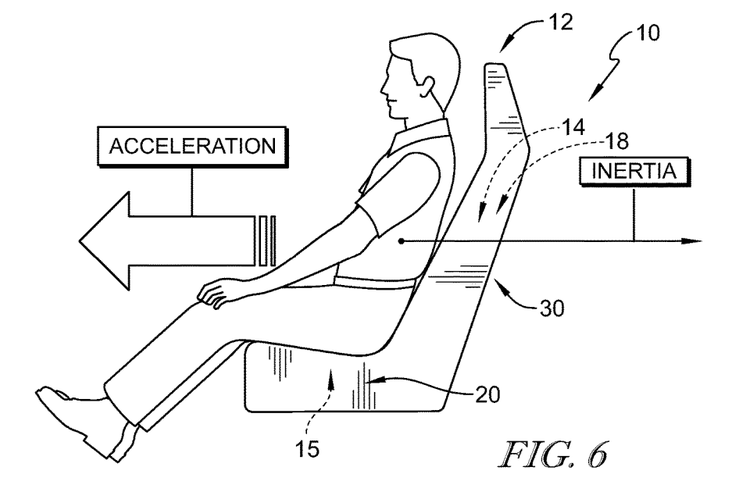
FIG. 6 is a side elevation and diagrammatic view of the occupant support of FIG. 1 illustrating forces experienced by the occupant during forward acceleration of the seat frame from forward acceleration of a vehicle supporting the occupant support.

Acceleration of the vehicle where occupant support 10 is mounted is applied to the occupant through occupant support 10 as suggested in FIGS. 5 and 6. Acceleration may be negative such as a deceleration. During a vehicle acceleration event, the momentum of the occupant resists the acceleration as suggested in FIGS. 5 and 6. This may cause the occupant to feel a pressure of their body acting against occupant support 10. Suspension systems 18 of the present disclosure allow movement of the occupant relative to seat frame 12 to reduce the magnitude of the acceleration felt by the occupant.

The acceleration may be a lateral acceleration in response to a right turn as suggested in FIG. 5. Suspension systems 18 allow movement of the occupant such that the centrifugal force may be parallel with the body and angled relative to vertical. The inertial force may be perpendicular to the centrifugal force and extends away from the lateral acceleration.

Figure 7:
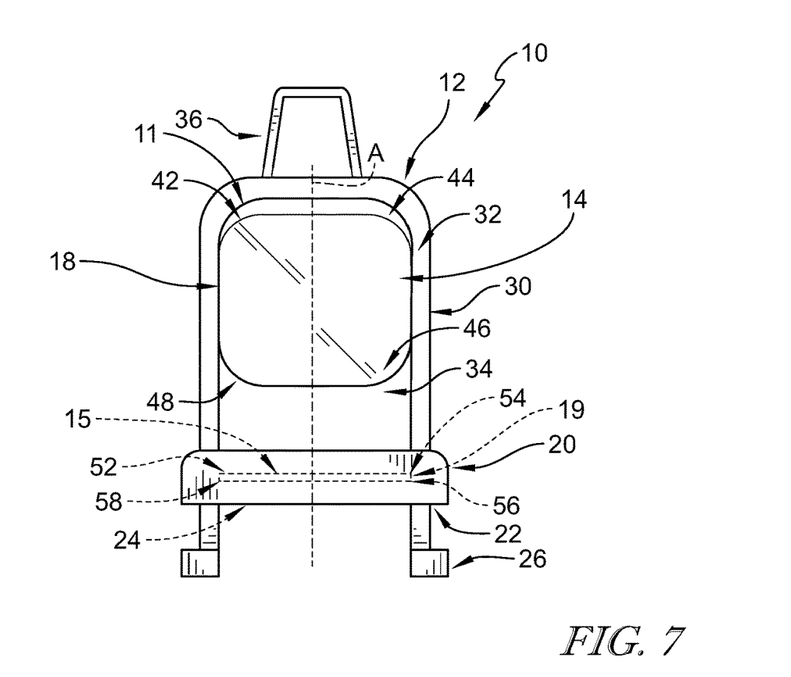
FIG. 7 is a front elevation and diagrammatic view of the occupant support of FIG. 1 showing that the suspension-control units hold the suspension mats across the seat-pan space and seat-back space of the seat frame and suggesting that the suspension mats are aligned along an axis of the seat frame to support the occupant in an upright position on the occupant support.
Figure 8:
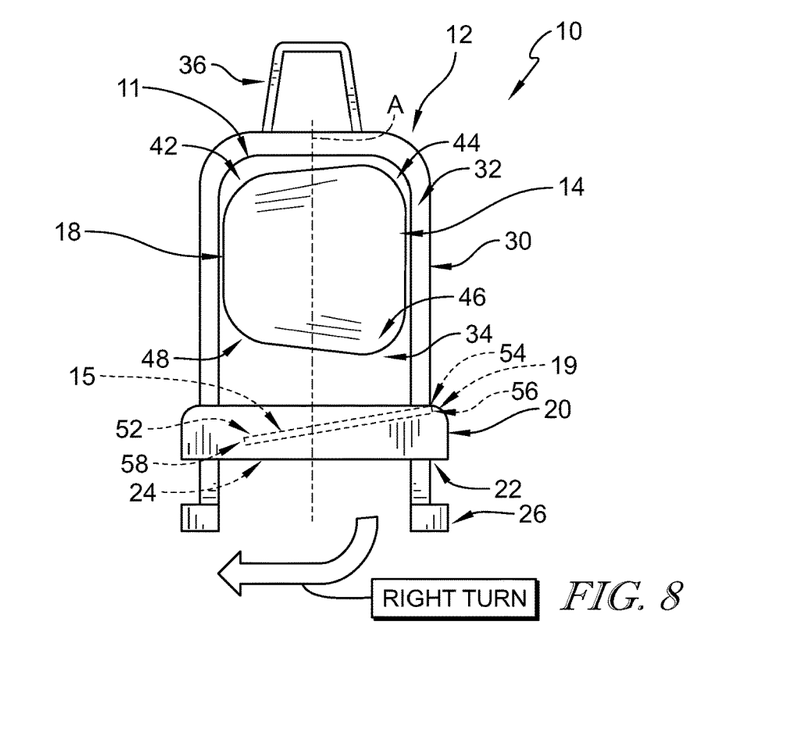
FIG. 8 is a view similar to FIG. 7 showing the suspension mats moved relative to the axis of the seat frame to lean the occupant toward a right side of the seat frame during a right turn of a vehicle supporting the seat frame.

Suspension mats 14, 15 are aligned with axis A to hold the occupant in an upright position during steady-state movement of the vehicle as suggested in FIG. 7. In the illustrative embodiment, bands 44, 46, 54, 56 are shortened and bands 42, 48, 52, 58 are lengthened to move suspension mats 14, 15 relative to seat frame 12 during a right turn of the vehicle to lean the occupant toward the right side of seat frame 12 relative to axis A as suggested in FIG. 8. Likewise, bands 44, 46, 54, 56 are lengthened and bands 42, 48, 52, 58 are shortened to move suspension mats 14, 15 relative to seat frame 12 during a left turn of the vehicle to lean the occupant toward the left side of seat frame 12 relative to axis A. Shortening and lengthening may be relative and may include moving bands 42, 44, 46, 48, 52, 54, 56, 58 toward and away from frame 12 without varying a length of bands 42, 44, 46, 48, 52, 54, 56, 58.

Figure 9:
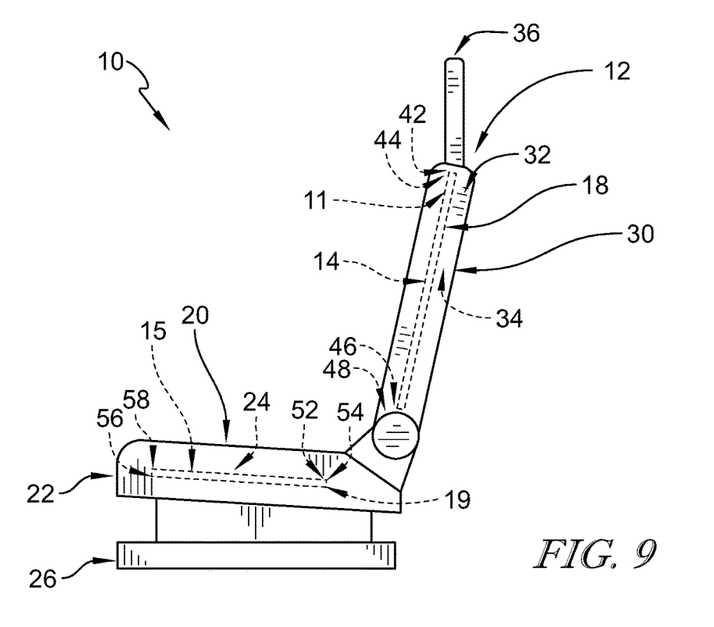
FIG. 9 is a side elevation and diagrammatic view of the occupant support of FIG. 1 showing that the suspension mats are aligned along the seat frame to support the occupant in an upright position on the occupant support.
Figure 10:
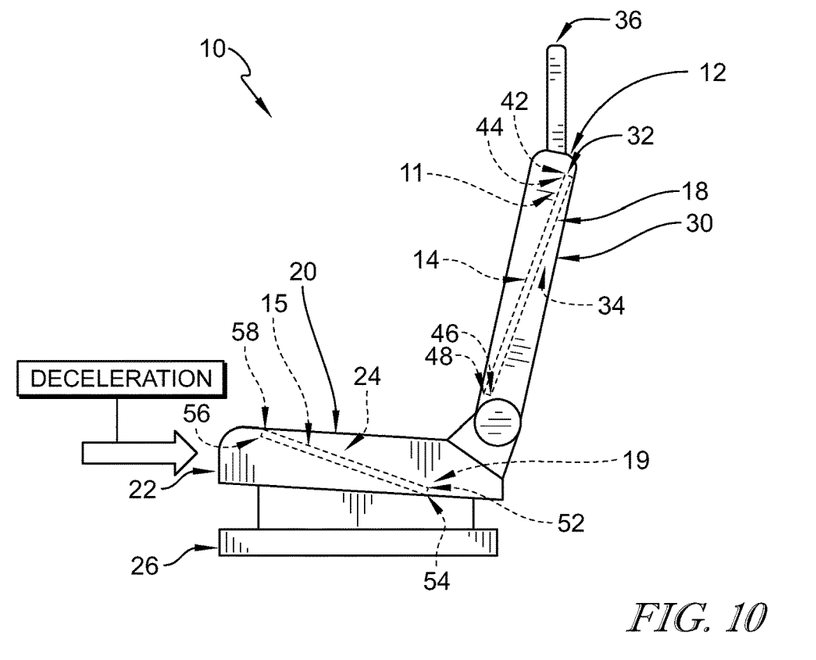
FIG. 10 is a view similar to FIG. 9 showing the suspension mats moved relative to the seat frame to lean the occupant back relative to the seat frame during a deceleration of a vehicle supporting the seat frame.

Suspension mats 14, 15 are aligned with seat back 30 and seat pan 20, respectively, to hold the occupant in an upright position during steady-state movement of the vehicle as suggested in FIG. 9. In the illustrative embodiment, bands 46, 48, 56, 58 are shortened and bands 42, 44, 52, 54 are lengthened to move suspension mats 14, 15 relative to seat frame 12 during deceleration of the vehicle to lean the occupant backward relative to seat frame 12 as suggested in FIG. 10. Likewise, bands 46, 48, 56, 58 are lengthened and bands 42, 44, 52, 54 are shortened to move suspension mats 14, 15 relative to seat frame 12 during acceleration of the vehicle to lean the occupant forward relative to seat frame 12.

Controller 13 is configured to determine the acceleration of seat frame 12. Controller 13 is configured to coordinate movement of suspension mats 14, 15 to accommodate for acceleration in various directions. For example, suspension mats 14, 15 can move relative to seat frame 12 to accommodate forward acceleration during a right turn of the vehicle where the combined acceleration is between lateral and medial directions relative to seat frame 12. In the illustrative example, bands 44, 54 can be shortened and bands 48, 58 can be lengthened to lean the occupant forward and to the right relative to seat frame 12.

In illustrative embodiments, a motion-sickness mitigation system may be used with a vehicle seat to minimize motion sickness experienced by an occupant resting on the vehicle seat. The motion-sickness mitigation system may include one or more gravity dampers (or G dampers). FIG. 5 is a diagrammatic view showing a body of an occupant counterbalances within a vehicle moving in the opposite direction. FIG. 6 is a diagrammatic view showing inertial force experienced by an occupant that is accelerating in an occupant support.

Motion sickness is a condition which may include a number of associated symptoms. The rise of autonomous vehicles may lead to an increase in the number of occupants that experience motion sickness. Many activities unrelated to driving may have a worsening effect on the frequency and severity of motion sickness symptoms. For example, motion sickness may occur when attempting to read or watch screen content while moving. It is desired to address motion sickness and minimize or eliminate the effects of its symptoms.

Various symptoms of motion sickness that may be alleviated by one or more embodiments of the present disclosure include cold sweating, increased salivation, pallor (skin color), drowsiness, headache, severe pain, nausea, vomiting, and sopite syndrome (which includes profound drowsiness and persistent fatigue which may result in hours or days of boredom, apathy, increased irritability, and personality changes). The symptoms mentioned above may have a response dependent upon the provocativeness of stimulation, relative susceptibility of the person, and prior experiences.

Results from motion sickness field testing show an abrupt duration of less than two seconds in changes of x-G forces and y-G forces. G force loading was less than 1 G in each axis with rapid combined x-G forces and y-G forces provoking motion sickness within two seconds. Each test subject experienced high motion sickness for about half of the testing time and each subject noted that they would not have continued reading as long as they did during the test. An S-curve including slight rolling hills through a dark tunnel provoked motion sickness in some cases. Test subjects experienced some level of residual motion sickness symptoms following testing.

The present disclosure provides systems to mitigate or eliminate motion sickness by reducing the effects of acceleration or deceleration and reducing or controlling vehicle vibration levels either within the vehicle suspension or within the seating system. A gravity damper (or G damper) system may provide partial car motion cancellation relative to the occupant, may absorb inertial forces to provide a constant state to the body of occupant, and may reduce or override uncomfortable vibrations that may result in motion sickness.

Anyone may be vulnerable to the effects of motion sickness. It may occur even for blind people that experience visual or other sensory-dependent adaptation to the moving environment. Although complex interactions may not be fully understood because there are significant individual variations, there may be vestibular inputs and visceral inputs due to motion, and there may be a relationship between the head and the corresponding torso movements of a person. The sensory conflict theory provides that motion sickness may be caused by a discrepancy between the expected and actual sensory feedback. The sensory conflict theory may be the most widely-accepted theory and differentiates between somatic (muscles and joints) and visceral (gut) receptors which may act as biological accelerometers.

The suspension system for mitigating motion-sickness is based on Newton Laws of Motion. When a force is applied on a freely moving object in order to accelerate, decelerate, or change its direction, an equal inertial force acts on the object in an opposite direction of the applied force. An occupant can experience or feel that inertial force, which is an indicator of motion for their vestibular system.

The inertial force is proportional to the acceleration, so reducing the acceleration decreases the inertia force. Decoupling the occupant support from the rest of the vehicle, may allow it to freely move in the opposite direction of the vehicle acceleration, thus reducing the acceleration sustained by the occupant body and as a result the inertial force and the perception of motion. Following this principle, this disclosure may enable the occupant support to have a certain degree of free motion relatively to the vehicle frame, to enable it to move in the opposite direction of the vehicle acceleration.

This degree of free motion may be controlled via some dampening solution, to avoid an abrupt stop when reaching the limit of the free motion. The direction of free motion may also be controlled to maximize the occupant stability during the movement. Enabling the occupant body to describe the trajectory of a pendulum may create a centrifugal force (perpendicular to the inertial force), promoting stability.

A cushion for seat back is connected to seat back suspension mat as suggested in FIGS. 1 and 4. A cushion for seat bottom is connected to seat bottom suspension mat. Each suspension mat may be formed of an elastic or otherwise deformable material. Each suspension mat may have connection portions for attachment to at least a pair of mounting posts. The mounting posts may be adapted to mount between one of the seat back suspension mat and the seat bottom suspension mat. Occupant support 10 includes at least one pair of motors for moving the mounting posts for tension adjustment of the seat back suspension mat or the seat bottom suspension mat.

According to an aspect of the present disclosure, an occupant support for use in a vehicle may include a seat frame 12, a seat pad 16, and a suspension system 18. In illustrative embodiments, the seat frame 12 may be adapted to couple with the vehicle for movement with the vehicle. The seat frame 12 may be formed to define a seat-pan space 24. In illustrative embodiments, the seat pad 16 may be coupled with the seat frame 12 to provide a comfortable support interface for an occupant of the occupant support.

In illustrative embodiments, the suspension system 18 may be configured to provide relative movement between the seat pad 16 and the seat frame 12. The suspension system 18 may include an elastic suspension mat 14 coupled with the seat pad 16 and arranged to extend across the seat-pan space. The suspension system 18 may include a plurality of suspension-control units 11, 19 coupled to the seat frame 12 and the elastic suspension mat 14. The suspension system 18 may include and a controller 13.

In illustrative embodiments, each suspension-control unit 11, 19 may include a band 42, 44, 46, 48 coupled to the elastic suspension mat 14 and a motor 41, 43, 45, 47 coupled to the seat frame 12 and corresponding band. The motor may be configured to move the band to vary a tension of the elastic suspension mat. The controller 13 may be configured to control the motors 41, 43, 45, 47 in response to an acceleration of the seat frame 12 to adjust a suspension of the occupant support 10 and reduce a magnitude of acceleration experienced by the occupant to combat motion sickness.

In illustrative embodiments, each suspension-control unit 11, 19 further includes a mounting post coupled to the motor and the band and the motor is configured to move the mounting post along a predetermined path to vary the tension of the elastic suspension mat.

In illustrative embodiments, the seat frame 12 includes a left lateral side and a right lateral side spaced apart from the left lateral side. The plurality of suspension-control units 11, 19 may include a first suspension control unit located on the left lateral side of the seat frame and a second suspension control unit located on the right lateral side of the seat frame. The controller 13 may be configured to cause the first suspension control unit and the second suspension control unit to vary a tension of the elastic suspension mat to raise the seat pad 16 near the left lateral side and lower the seat pad 16 near the right lateral side in response to the acceleration of the seat frame 12 being a right turn acceleration.

In illustrative embodiments, the seat frame includes a fore end and an aft end spaced apart from the fore end. The plurality of suspension-control units 11, 19 may include a third suspension control unit located at the fore end of the seat frame 12 and a fourth suspension control unit located at the aft end of the seat frame 12. The controller may be configured to cause the third suspension control unit and the fourth suspension control unit to vary the tension of the elastic suspension mat to raise the seat pad 16 near the fore end and lower the seat pad near the aft end in response to the acceleration of the seat frame being an aft acceleration.

In illustrative embodiments, the seat frame 12 includes an upper end and a lower end spaced apart from the upper end. The plurality of suspension-control units 11, 19 may include a first suspension control unit located at the upper end of the seat frame and a second suspension control unit located at the lower end of the seat frame 12. The controller 13 may be configured to cause the first suspension control unit and the second suspension control unit to vary the tension of the elastic suspension mat to move a lower end of the seat pad forward and to move an upper end of the seat pad aft in response to the acceleration of the seat frame being a forward acceleration.

In illustrative embodiments, the elastic suspension mat includes a body and a perimeter edge defined around the body. The plurality of suspension-control units 11, 19 may be configured to move the perimeter edge relative to the seat frame.

In illustrative embodiments, the motor is configured to wind the band around itself and to unwind the band to vary the tension of the elastic suspension mat.

According to another aspect of the present disclosure, an occupant support 10 comprises a seat frame 12, a seat pad 16, and a suspension system 18. The suspension system 18 may be configured to provide relative movement between the seat pad and the seat frame. The suspension system 18 may include a suspension mat 14 coupled with the seat pad. The suspension system 18 may include a plurality of suspension-control units 11, 19 coupled to the seat frame and the suspension mat. The plurality of suspension-control units 11, 19 may be configured to vary a tension of the suspension mat 14 in response to an acceleration of the seat frame 12.

In illustrative embodiments, each suspension-control unit includes a band 42, 44, 46, 48 and an actuator 41, 43, 45, 47. The band may be coupled with the suspension mat and the actuator. The actuator may be configured to move the band in response to the acceleration of the seat frame 12 to vary the tension of the suspension mat 14. In illustrative embodiments, the occupant support further comprises a controller 13 configured to control the actuators 41, 43, 45, 47 individually to vary the tension of the suspension mat 14 in response to the acceleration of the seat frame 12.

In illustrative embodiments, each suspension-control unit 11, 19 further includes a mounting post coupled to the actuator and the band. The actuator may be configured to move the mounting post along a predetermined path to vary the tension of the suspension mat 14. In illustrative embodiments, the actuator is configured to wind the elastic band around itself and to unwind the elastic band to change the tension of the elastic band.

In illustrative embodiments, the seat frame 12 includes a left lateral side and a right lateral side spaced apart from the left lateral side. The plurality of suspension-control units 11, 19 includes a first suspension control unit located on the left lateral side of the seat frame and a second suspension control unit located on the right lateral side of the seat frame. The controller 13 may be configured to cause the first suspension control unit and the second suspension-control unit to vary the tension of the suspension mat 14 to raise the seat pad near the left lateral side and lower the seat pad near the right lateral side in response to the acceleration of the seat frame 12 being a right turn acceleration.

In illustrative embodiments, the seat frame 12 includes a fore end and an aft end spaced apart from the fore end. The plurality of suspension-control units 11, 19 includes a first suspension control unit located at the fore end of the seat frame 12 and a second suspension control unit located at the aft end of the seat frame 12. The controller 13 may be configured to cause the first suspension control unit and the second suspension control unit to vary the tension of the suspension mat 14 to raise the seat pad 16 near the fore end and lower the seat pad 16 near the aft end in response to the acceleration of the seat frame 12 being an aft acceleration.

In illustrative embodiments, the seat frame 12 includes an upper end and a lower end spaced apart from the upper end. The plurality of suspension-control units 11, 19 includes a first suspension control unit located at the upper end of the seat frame 12 and a second suspension control unit located at the lower end of the seat frame 12. The controller 13 may be configured to cause the first suspension control unit and the second suspension control unit to vary the tension of the suspension mat 15 to move a lower end of the seat pad 16 forward and to move an upper end of the seat pad aft in response to the acceleration of the seat frame 12 being a forward acceleration.

In illustrative embodiments, the seat frame is formed to define a seat-pan space and the suspension mat extends across the seat-pan space. The suspension mat may include a body. The suspension mat may include a perimeter edge defined around the body. The plurality of suspension-control units may be configured to move the perimeter edge relative to the seat frame. In illustrative embodiments, the suspension mat may comprise an elastic material.

According to another aspect of the present disclosure, a method comprises providing a seat frame 12, a seat pad 16, and a suspension mat coupled to the seat frame 12 and the seat pad 16. The method may further comprise accelerating the seat frame 12. The method may further comprise adjusting a tension of the suspension mat in response to the seat frame 12 accelerating.

In illustrative embodiments, the method may further comprise raising a left lateral side of the suspension mat and lowering a right lateral side of the suspension mat in response to accelerating the seat frame with a right turn acceleration.

In illustrative embodiments, the method may further comprise raising a fore end of the suspension mat and lowering an aft end of the suspension mat in response to accelerating the seat frame 12 with an aft acceleration.

The invention claimed is:

1. An occupant support for use in a vehicle, the occupant support comprising
 a seat frame adapted to couple with the vehicle for movement with the vehicle, the seat frame formed to define a seat-pan space,
 a seat pad coupled with the seat frame to provide a support interface for an occupant of the occupant support, and
 a suspension system configured to provide relative movement between the seat pad and the seat frame, the suspension system including an elastic suspension mat coupled with the seat pad and arranged to extend across the seat-pan space, a plurality of suspension-control units coupled to the seat frame and the elastic suspension mat, and a controller, wherein each suspension-control unit includes a band coupled to the elastic suspension mat and an actuator coupled to the seat frame and corresponding band, the actuator is configured to move the band to vary a tension of the elastic suspension mat, and the controller is configured to control the actuators in response to an acceleration of the seat frame to adjust a suspension of the occupant support and reduce a magnitude of acceleration experienced by the occupant to minimize motion sickness experienced by the occupant.

2. The occupant support of claim 1, wherein each suspension-control unit further includes a mounting post coupled to the actuator and the band, the actuator is a motor, and the motor is configured to move the mounting post along a predetermined path to vary the tension of the elastic suspension mat.

3. The occupant support of claim 2, wherein the seat frame includes a left lateral side and a right lateral side spaced apart from the left lateral side, the plurality of suspension-control units includes a first suspension control unit located on the left lateral side of the seat frame and a second suspension control unit located on the right lateral side of the seat frame, and the controller is configured to cause the first suspension control unit and the second suspension control unit to vary a tension of the elastic suspension mat to raise the seat pad near the left lateral side and lower the seat pad near the right lateral side in response to the acceleration of the seat frame being a right turn acceleration.

4. The occupant support of claim 3, wherein the seat frame includes a fore end and an aft end spaced apart from the fore end, the plurality of suspension-control units includes a third suspension control unit located at the fore end of the seat frame and a fourth suspension control unit located at the aft end of the seat frame, and the controller is configured to cause the third suspension control unit and the fourth suspension control unit to vary the tension of the elastic suspension mat to raise the seat pad near the fore end and lower the seat pad near the aft end in response to the acceleration of the seat frame being an aft acceleration.

5. The occupant support of claim 1, wherein the seat frame includes an upper end and a lower end spaced apart from the upper end, the plurality of suspension-control units includes a first suspension control unit located at the upper end of the seat frame and a second suspension control unit located at the lower end of the seat frame, and the controller is configured to cause the first suspension control unit and the second suspension control unit to vary the tension of the elastic suspension mat to move a lower end of the seat pad forward and to move an upper end of the seat pad aft in response to the acceleration of the seat frame being a forward acceleration.

6. The occupant support of claim 1, wherein the elastic suspension mat includes a body and a perimeter edge defined around the body and the plurality of suspension-control units is configured to move the perimeter edge relative to the seat frame.

7. The occupant support of claim 1, wherein the actuator is a motor and the motor is configured to wind the band around itself and to unwind the band to vary the tension of the elastic suspension mat.

8. An occupant support comprising
a seat frame,
a seat pad, and
a suspension system configured to provide relative movement between the seat pad and the seat frame, the suspension system including a suspension mat coupled with the seat pad, a plurality of suspension-control units coupled to the seat frame and the suspension mat, and the plurality of suspension-control units being configured to vary a tension of the suspension mat in response to an acceleration of the seat frame, wherein the seat frame is formed to define a seat-pan space and the suspension mat extends across the seat-pan space, the suspension mat includes a body and a perimeter edge defined around the body, and the plurality of suspension-control units is configured to move the perimeter edge relative to the seat frame.

9. The occupant support of claim 8, wherein each suspension-control unit includes a band and an actuator, the band is coupled with the suspension mat and the actuator, and the actuator is configured to move the band in response to the acceleration of the seat frame to vary the tension of the suspension mat.

10. The occupant support of claim 9, further comprising a controller configured to control the actuators individually to vary the tension of the suspension mat in response to the acceleration of the seat frame.

11. The occupant support of claim 9, wherein each suspension-control unit further includes a mounting post coupled to the actuator and the band and the actuator is configured to move the mounting post along a predetermined path to vary the tension of the suspension mat.

12. The occupant support of claim 9, wherein the actuator is configured to wind the band around itself and to unwind the band to change a tension of the band.

13. The occupant support of claim 8, wherein the seat frame includes a left lateral side and a right lateral side spaced apart from the left lateral side, the plurality of suspension-control units includes a first suspension control unit located on the left lateral side of the seat frame and a second suspension control unit located on the right lateral side of the seat frame, and the controller is configured to cause the first suspension control unit and the second suspension-control unit to vary the tension of the suspension mat to raise the seat pad near the left lateral side and lower the seat pad near the right lateral side in response to the acceleration of the seat frame being a right turn acceleration.

14. The occupant support of claim 8, wherein the seat frame includes a fore end and an aft end spaced apart from the fore end, the plurality of suspension-control units includes a first suspension control unit located at the fore end of the seat frame and a second suspension control unit located at the aft end of the seat frame, and the controller is configured to cause the first suspension control unit and the second suspension control unit to vary the tension of the suspension mat to raise the seat pad near the fore end and lower the seat pad near the aft end in response to the acceleration of the seat frame being an aft acceleration.

15. The occupant support of claim 8, wherein the seat frame includes an upper end and a lower end spaced apart from the upper end, the plurality of suspension-control units includes a first suspension control unit located at the upper end of the seat frame and a second suspension control unit located at the lower end of the seat frame, and the controller is configured to cause the first suspension control unit and the second suspension control unit to vary the tension of the suspension mat to move a lower end of the seat pad forward and to move an upper end of the seat pad aft in response to the acceleration of the seat frame being a forward acceleration.

16. The occupant support of claim 8, wherein the suspension mat comprises an elastic material.

17. A method comprising
providing a seat frame, a seat pad, and a suspension mat coupled to the seat frame and the seat pad,
accelerating the seat frame,
adjusting a tension of the suspension mat in response to the seat frame accelerating, and
raising a left lateral side of the suspension mat and lowering a right lateral side of the suspension mat in response to accelerating the seat frame with a right turn acceleration.

18. The method of claim 17, further raising a fore end of the suspension mat and lowering an aft end of the suspension mat in response to accelerating the seat frame with an aft acceleration.

\* \* \* \* \*